United States Patent

[11] 3,618,779

| [72] | Inventor | Gerald J. Goodman |
| | | Chomedey, Laval, Canada |
| [21] | Appl. No. | 878,843 |
| [22] | Filed | Nov. 21, 1969 |
| [45] | Patented | Nov. 9, 1971 |
| [73] | Assignee | Air-Gest International Corp. |
| | | Montreal, Quebec, Canada |
| [32] | Priority | Oct. 31, 1969 |
| [33] | | Canada |
| [31] | | 066,373 |

[54] SEWAGE TREATMENT APPARATUS
5 Claims, 3 Drawing Figs.

[52] U.S. Cl. .................................................. 210/195, 210/221, 210/525
[51] Int. Cl. .................................................. C02c 1/12
[50] Field of Search .................................................. 210/195, 220, 221

[56] References Cited
UNITED STATES PATENTS

| 2,574,685 | 11/1951 | Baxter et al. ................. | 210/221 X |
| 2,989,186 | 6/1961 | Weis ................................ | 210/221 X |
| 3,161,590 | 12/1964 | Weis et al. ..................... | 210/221 |
| 3,195,727 | 7/1965 | Kibbee ........................... | 210/221 X |
| 3,202,285 | 8/1965 | Williams ......................... | 210/221 X |
| 3,228,526 | 1/1966 | Ciabattari et al. ............. | 210/221 X |
| 3,438,499 | 4/1969 | Reckers .......................... | 210/195 X |

Primary Examiner—Michael Rogers
Attorney—Browdy and Neimark

ABSTRACT: A sewage treatment apparatus or plant wherein treatment of the sewage is achieved by aeration. The apparatus consists of a tank having an inlet for raw sewage and an outlet for decomposed sewage, and an inclined baffle structure between the inlet and outlet to divide the tank into an aeration chamber and a settling chamber. The inclined baffle structure permitting sewage flow beneath and above the baffle structure, and a compressor for delivering air under pressure to an air diffuser positioned adjacent the lowermost portion of the inclined baffle structure whereby air in the form of bubbles issuing from the diffuser results in countercurrent flow in the aeration and settling chambers causing intimate mixing and aeration of all of the sewage in the tank. The apparatus also provides for means for returning scum from the surface of the settling chamber to the aeration chamber.

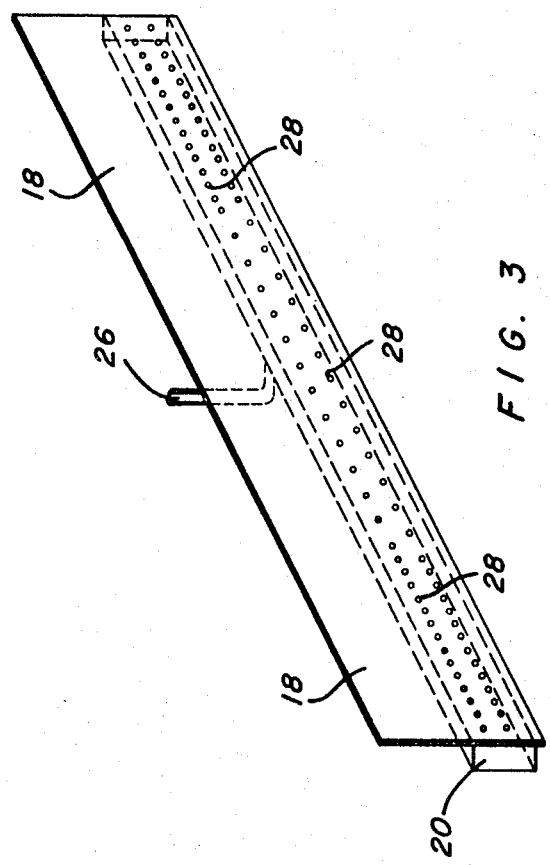

SEWAGE TREATMENT APPARATUS

The present invention relates to sewage treatment apparatus and particularly to apparatus for the aerobic treatment of human wastes.

By far the most common method of eliminating and decomposing sewage in rural and outlying districts and in some towns, is by way of septic tank treatment of buildings. The sewage when emptied into the septic tanks is decomposed by an aerobic bacterial action in a properly functioning septic system, but as it is estimated that a majority of all septic systems now in use are ineffectual in decomposing human waste, it is obvious that a more effective decomposition apparatus is required if pollution of lakes and rivers is to be prevented.

The present invention relates to an apparatus which provides for the aerobic digestion and decomposition of human sewage by subjecting the sewage to continuous aerating action. In addition, the same apparatus which aerates the sewage also causes mixing and movement of sewage in the tank whereby all the sewage introduced into the tank is subjected to repeated settling, recirculation and aeration treatment before it is permitted egress from the tank in a satisfactorily treated condition.

Many attempts have been made to provide sewage treatment apparatus using aeration features, but all have been generally unsatisfactory in the view of the private user, either for reasons of cost of installation or maintenance or from the standpoint of overall inefficiency. Some known sewage aeration apparatus include movable paddles or wheels in the sewage tank, and apparatus which includes these movable component parts is to be avoided in view of initial cost and maintenance and repair demands.

Other known sewage treatment apparatus consists of a tank having two inclined parallel and spaced apart baffles with an air diffuser system therebetween. The compressed air issuing from the diffuser results in a circular flow of the sewage in an aeration compartment and a drawing of material from a settling compartment for introduction into the aeration compartment. However, in such systems one of the parallel baffles projects upwardly from the bottom of the tank and the other projects downwardly from the top with the result that the sewage flow into the diffuser air bubble stream is taken directly and only from the settling compartment with the result that there is no intimate mixing of sewage from both of the compartments at that point where the air agitation action is the greatest which is directly adjacent the diffuser. As a result, the mixing and aeration of the sewage in the tank is not as complete as possible with the consequence that output from the tank is slowed and the capacity of the system is limited accordingly.

The present invention overcomes the aforesaid disadvantages by providing a sewage treatment apparatus which is economical in manufacture and which has no moving parts in the tank to malfunction, thus ensuring long life and trouble-free operation. In addition, the inventive apparatus provides for complete and continuous aeration of the sewage material in the tank and recycling and mixing of material from both the aeration chamber and the settling chamber together to cause maximum decomposition and treatment of the sewage.

In its basic concept, the apparatus of the invention consists of a suitable tank capable of handling the daily treatment requirement which has an inlet for sewage, and a remotely positioned outlet leading to a suitable dispersion area such as a tile field. An inclined baffle extending completely across the tank divides the tank into an aeration chamber adjacent the inlet and a settling chamber adjacent the outlet. The inclined baffle is spaced from the bottom of the tank and slots or elongated apertures are provided in the top portion of the inclined baffle thereby permitting some sewage flow between the aeration and settling chambers, both above and below the inclined baffle. To prevent flow of sewage directly from the inlet to the outlet a second or vertical baffle is provided at liquid height or level in the settling chamber between the inclined baffle and the outlet. An air diffuser or aeration assembly is positioned adjacent the lowermost end of the inclined baffle on the aeration chamber side, and air under pressure is introduced into the diffuser from a compressor. The air being emitted from the diffuser travels in bubble form up the underside of the inclined baffle thus aerating the sewage in the aeration chamber and also imparting a circular mixing movement to the sewage in the latter chamber. In addition the emission of bubbles from the diffuser causes a current and lowering of pressure in the lower area of the settling tank adjacent the lowermost end of the inclined baffle which results in an additional downward movement of solids in the settling chamber where it is combined with the sewage from the aeration chamber and carried upwardly by the rising bubbles from the diffuser. Thus there is a continuous mixing and aeration of the sewage present in each of the chambers by a constant and continuous reintroduction of the solid and undecomposed material in the settling chamber back into the aeration chamber. When the sewage waste is broken down and decomposed into a fine water-carried solids in suspension and supernatant liquid it is then permitted to pass through the outlet for disposal.

In addition and as a further embodiment of the invention a scum return extending from the surface of liquid in the settling chamber to the aeration chamber and operational by compressed air from the compressor is provided through air lift method.

It is the main object of the invention to provide a sewage treatment plant or apparatus for aerating and decomposing sewage to a high degree of treatment which is economical in manufacture and requiring a minimum of upkeep maintenance.

It is a further object of the invention to provide a sewage treatment system for human waste consisting of a tank divided by an inclined baffle into an aerating chamber and a settling chamber, with an air diffuser provided adjacent the lowermost edge of the inclined baffle to provide an upwardly moving flow of bubbles to aerate the sewage material and to agitate and mix together sewage from the aeration chamber and the solids drawn from the settling chamber as a result of displacement of air by the diffuser. This achieves maximum aeration of all of the sewage and decomposition of all of the solids contained in the tank.

These and other objects will become apparent from the following description with reference to the accompanying drawings wherein:

FIG. 3 is an enlarged perspective view of the air diffuser plate shown in FIGS. 1 and 2.

Figure 1:
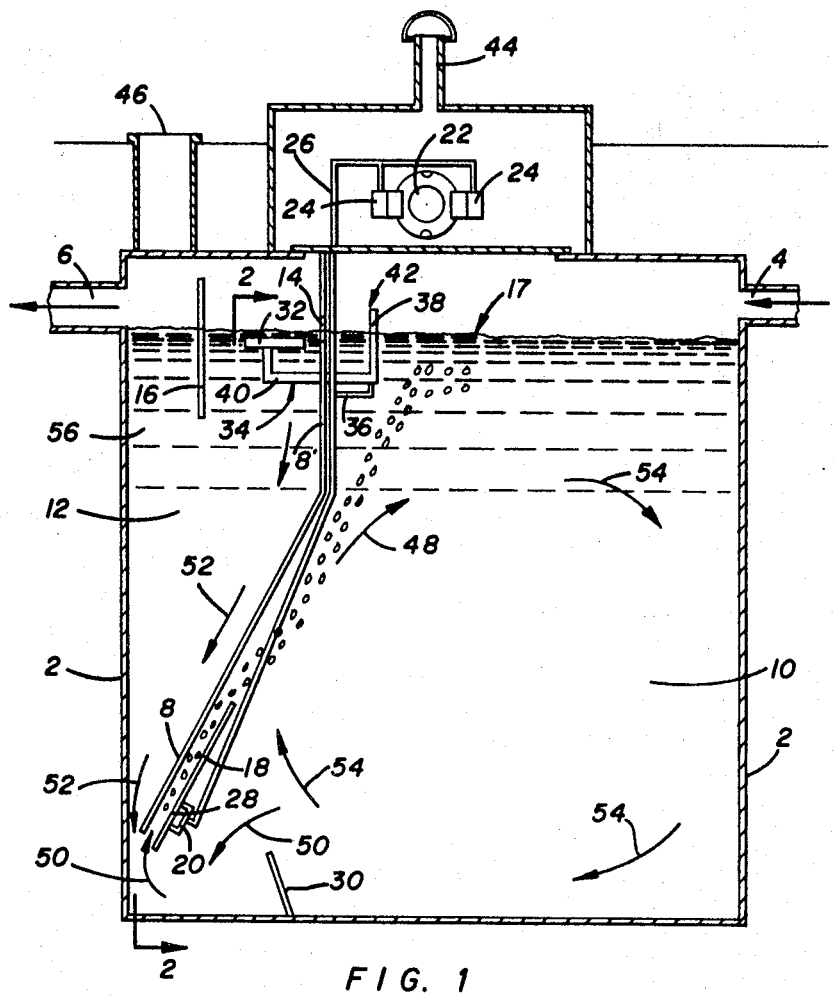
FIG. 1 is a sectional side view of the sewage treating apparatus of the present invention.

Referring now specifically to the attached drawings it will be noted that the tank 2 shown is of generally rectangular or boxlike configuration but it will be appreciated that the tank could be cylindrical, or oval-shaped, or of any other suitable configuration.

Adjacent the top of one side of the tank 2 is an inlet port 4 connected by piping (not shown) to a sewage source to permit entry of waterborne sewage into the tank. On another side of the tank is an outlet port 6 to permit egress of decomposed sewage and supernatant liquid from the tank.

As inclined baffle 8 extends completely across the tank (see also FIG. 2) and is secured to the sidewalls by suitable means such as bolts or by welding (not shown) if the tank and inclined baffle 8 are of metal construction. As shown in the drawings the upper portion 8' of the inclined baffle is vertical but this is a design feature only and the baffle could be inclined throughout its entire height.

The baffle 8 divides the tank into an aerating chamber 10 and a settling chamber 12. The baffle 8 does not extend completely to the bottom of the tank leaving a lower opening communicating the two chambers, and the upper portion 8' of the baffle 8 is provided with elongate slots or openings 14 (see FIG. 2) at liquid level to permit the flow of sewage material between the two chambers at liquid level.

A vertical baffle 16 is provided in the settling chamber 12 to prevent the flow of solid material and scum directly from inlet port 4 through slots 14 and out outlet 6. The baffle 16 extends from above to below the normal liquid level 17 to prevent surface material from entering outlet 6, but decomposed material in aqueous suspension and supernatant liquid may of course be discharged through the outlet 6.

An air diffuser is provided adjacent the lowermost end of the inclined baffle 8. This diffuser is in the form of a guide plate or diffuser plate 18 which is positioned parallel with but spaced from the inclined baffle 8. The diffuser plate 18 may be secured directly to the inclined baffle 8 by suitable means such as brackets (not shown) or may be secured directly to the sidewalls of the tank in suitable position with respect to the inclined baffle 8. The diffuser plate extends completely across the tank and on its side remote from the baffle 8 is provided with an air channel 20, into which air is forced by motor 22 and compressors or blowers 24 through piping or tubing 26. The air channel is secured in air- and watertight relation to the back of diffuser plate 18 and exit of air from the channel 20 is possible only through a series of holes or apertures 28 (see FIG. 3) provided longitudinally in one or more rows along the surface of the diffuser plate facing the inclined baffle.

The diffuser plate 18, apertures 28, air channel 20 and piping 26 are shown in FIG. 3. In this drawing air is conveyed into the channel 20 by only one conduit 26, but it will be appreciated that more than one conduit extending downwardly from the compressors or blowers 24 could be used. If, as shown in the drawings, only one conduit 26 is used the spacing between the apertures 28 along the diffuser plate will become less towards the outer ends of the plate to compensate for the air pressure drop along the length of the air channel 20.

Figure 2:
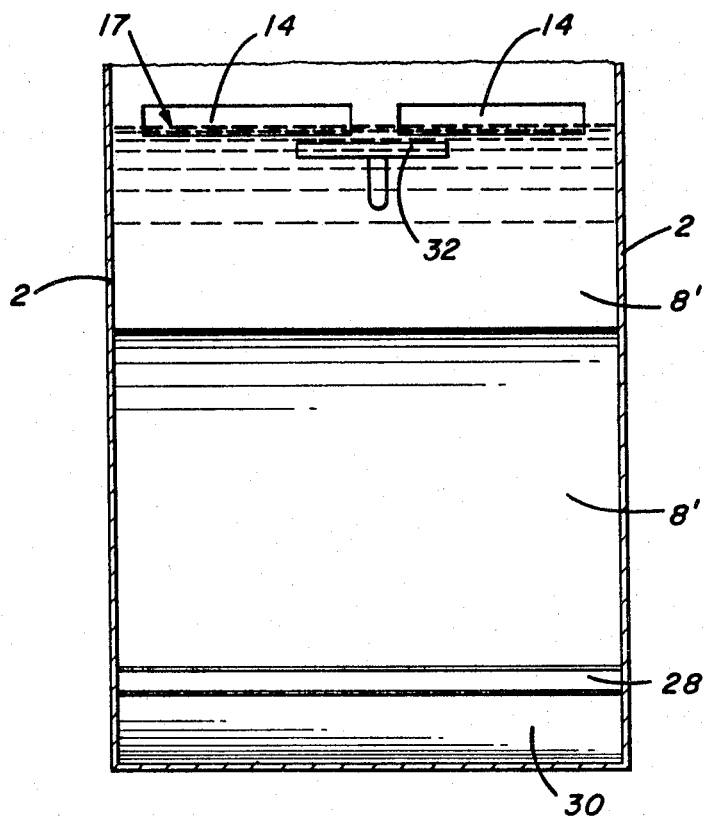
FIG. 2 is a partial sectional view taken along line 2—2 of FIG. 1.

As shown in FIGS. 1 and 2, a separate baffle 30 can be provided laterally across the bottom of the tank to facilitate mixing and aeration in the aeration chamber, but the presence of baffle 30 is not necessary for a successful operation of the apparatus.

A scum return arrangement is provided communicating between the settling chamber and the aeration chamber. This scum return may consist of a scum tray 32 positioned just below normal liquid level 17 connected to a U-shaped piping system indicated generally at 34 which returns the scum from the tray 32 to the aeration chamber 10. This scum return is accomplished by providing an air pressure conduit 36 from the main conduit 26 to the upright scum return pipe 38 which creates a partial vacuum in horizontal scum return pipe 40 and ambient air pressure on the scum in the tray forces the scum through the pipes 40 and 38 and out outlet 42 back into the aeration chamber.

The motor 42 and the compressor or blowers 24 are mounted conveniently above the tank with an electric cable supplying electricity to the motor in the usual manner. While one motor only is shown in the drawings, two could be supplied for standby services in the event of malfunction of the first, as the motor-compressor is proposed to be in continuous service and not intermittent. As shown in FIG. 1, an air-intake for the compressors is provided at 44, and an air outlet (not shown) from the tank may be provided (although it is not necessary), along with an inspection port 46.

In operation aqueous borne sewage enters the tank through inlet port 4 into the aeration chamber 10. With motor 22 and compressors 24 delivering air under pressure (the actual pressure used depending on the size or depth of the unit) through the apertures 28 a curtain of upwardly rushing air bubbles is formed between the underside of the inclined baffle and the diffusion plate with the result that an upwardly directed current of bubbles and sewage material is created along the inclined baffle 8 in the direction of arrow 48 in FIG. 1. As a further result sewage material in the aerating chamber moves in the direction of arrows 50 and sewage material in settling chamber 12 moves in the direction of arrows 52 to pass together upwardly through the bubble force chamber between the inclined baffle and the diffusion or guide plate where the material is completely agitated and aerated with maximum decomposition and treatment being the end result. As the air diffusion is continuous the sewage in the tank is endlessly being mixed, circulated, aerated and decomposed. In the aeration chamber the sewage material is continuously circulated as shown by the arrows 54, with portions flowing from the chamber 10 to the chamber 12 through slots 14, and portions continually entering the bubble force chamber in the directions of arrows 50 and 52.

It is the counterflow of currents 50 and 52 to meet and mix and be aerated between the inclined baffle 8 and the diffusion plate 18 that constitutes the thorough aeration, decomposition and treatment of the sewage as a result of the present apparatus and which has not before been possible with known sewage treating apparatus.

As the sewage becomes aerated and decomposed by the actions discussed above, supernatant liquid and finely divided solids in suspension find their way to the comparatively quiet area 56 behind baffle 16 in the settling chamber from where they flow from the tank via outlet 6.

Of course the motor-compressor unit may be regulated as to the amount of the air pressure delivered to the diffuser, thereby determining the degree of aeration and mixing of the sewage in the tank.

I claim:

1. Sewage treatment apparatus comprising a tank, and an inlet port in a side of the tank and an outlet port provided in a side of the tank remote from the inlet port, and an inclined baffle structure in the tank extending completely across the tank and spaced from the bottom thereof and dividing the tank into an aeration chamber adjacent the inlet port and a settling chamber adjacent the outlet port, and at least one unobstructed opening in the inclined baffled structure directly communicating the aeration and settling chambers at approximately normal liquid level to permit sewage flow from the aeration chamber to the settling chamber, and a restraining baffle adjacent the outlet port to prevent floating material from reaching the outlet port, a guide plate positioned adjacent lowermost portion of the inclined baffle structure and spaced therefrom to provide a passageway therebetween, said guide plate being spaced from the bottom of said tank, and air diffuser means to inject air into said passageway and spaced above he bottom of the tank and conduit means for connecting said air diffuser to an air compressor, the issuing of air under pressure from the air diffuser structure causing currents in the tank to move sewage from the aeration chamber and the settling chamber between the guide plate and the inclined baffle to effect aeration and intimate mixing of the sewage from both chambers therebetween.

2. Sewage treatment apparatus according to claim 1, wherein said guide plate consists of a diffuser plate extending completely across the tank, and said air diffuser means is mounted on said diffuser plate, and further comprising an air channel secured to the surface of the diffuser plate remote from the inclined baffle structure, said conduit being connected to said air channel, and one or more longitudinal rows of apertures in the diffuser plate whereby air under pressure moves from the air channel through the apertures and into the space between the inclined baffle structure and the diffuser plate.

3. Apparatus according to claim 1, further comprising means for returning scum from the surface of the sewage in the settling chamber to the aeration chamber.

4. Apparatus according to claim 3 wherein the scum returning means consists of a scum tray positioned below the surface of the sewage in the settling chamber and a U-shaped conduit extending from the scum tray through the inclined baffle structure and terminating in a scum outlet formed above the sewage in the aerating chamber, and a conduit conveying air under pressure to the U-shaped conduit to move by partial vacuum scum from the scum try to the scum outlet.

5. Apparatus according to claim 1, further comprising a bottom baffle projecting upwardly from the bottom of the tank and extending completely across the tank and inclined toward the inclined baffle structure.